(12) United States Patent
Tomita

(10) Patent No.: US 8,558,534 B2
(45) Date of Patent: Oct. 15, 2013

(54) ROTATIONAL ANGLE DETECTION DEVICE AND ELECTRIC POWER STEERING SYSTEM

(75) Inventor: Akihiro Tomita, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 299 days.

(21) Appl. No.: 12/893,528

(22) Filed: Sep. 29, 2010

(65) Prior Publication Data

US 2011/0080160 A1    Apr. 7, 2011

(30) Foreign Application Priority Data

Oct. 6, 2009 (JP) ................................ 2009-232616

(51) Int. Cl.
*H03D 13/00* (2006.01)
*G01R 7/00* (2006.01)
*G01P 3/48* (2006.01)
*G01B 7/30* (2006.01)
*G05B 11/42* (2006.01)
*G05B 5/01* (2006.01)

(52) U.S. Cl.
USPC ... 324/76.77; 324/141; 324/166; 324/207.25; 318/609; 318/610

(58) Field of Classification Search
USPC ................... 324/76.77; 318/536, 563
See application file for complete search history.

(56) References Cited

U.S. PATENT DOCUMENTS 1,436,280 A * 11/1922 Minorsky ........................... 318/8
1,612,119 A * 12/1926 Hewlett et al. ................ 318/563
2,584,666 A * 2/1952 Bockrath ......................... 244/38
2,680,241 A * 6/1954 Gridley .................... 340/870.19
2,810,520 A * 10/1957 Paulsen ............................. 377/17
2,814,725 A * 11/1957 Jacobs ............................. 327/10
2,944,157 A * 7/1960 McAuslan et al. ............ 250/233
2,950,428 A * 8/1960 Gievers ......................... 318/608
4,441,359 A * 4/1984 Ezoe .......................... 73/116.06
4,496,936 A * 1/1985 Kramer ............................. 341/6
4,587,485 A 5/1986 Papiernik
4,878,143 A * 10/1989 Kalal et al. ..................... 361/94

(Continued)

FOREIGN PATENT DOCUMENTS

EP    1 728 705 A2    12/2006
JP    A-64-000414    1/1989

(Continued)

OTHER PUBLICATIONS

Oct. 25, 2012 Extended European Search Report issued in European Patent Application No. 10186595.4.

(Continued)

*Primary Examiner* — Jermele M Hollington
*Assistant Examiner* — Christopher McAndrew
(74) *Attorney, Agent, or Firm* — Oliff & Berridge, PLC

(57) ABSTRACT

An ECU detects a steering angle that is an absolute angle based on a sine signal and a cosine signal that are output from a steering sensor. The ECU includes a three-phase pulse generator that generates, based on the sine signal and the cosine signal, three-phase pulse signals that have edges corresponding to predetermined rotational angles and that are set in such a manner that the predetermined rotational angles corresponding to the respective edges do not overlap each other and are at regular intervals. A microcomputer has a function as a second rotational angle detector that calculates a steering angle based on the pulse signals.

16 Claims, 13 Drawing Sheets

(56) References Cited

U.S. PATENT DOCUMENTS

| | | | |
|---|---|---|---|
| 5,019,773 A * | 5/1991 | Sugiura et al. | 324/166 |
| 5,052,117 A * | 10/1991 | Kubodera et al. | 33/501.9 |
| 5,278,759 A * | 1/1994 | Berra et al. | 701/1 |
| 5,648,757 A * | 7/1997 | Vernace et al. | 340/539.32 |
| 5,656,991 A * | 8/1997 | Hargenrader et al. | 340/438 |
| 5,760,562 A * | 6/1998 | Woodland et al. | 318/632 |
| 6,252,395 B1 * | 6/2001 | Aoyama et al. | 324/207.12 |
| 6,268,803 B1 * | 7/2001 | Gunderson et al. | 340/903 |
| 6,285,191 B1 * | 9/2001 | Gollomp et al. | 324/427 |
| 6,364,051 B1 * | 4/2002 | Kada et al. | 180/446 |
| 6,389,373 B1 * | 5/2002 | Ohya | 702/189 |
| 6,549,002 B2 * | 4/2003 | Ito et al. | 324/207.13 |
| 6,552,534 B2 * | 4/2003 | Desbiolles et al. | 324/207.25 |
| 6,745,116 B2 * | 6/2004 | Takuma et al. | 701/41 |
| 6,848,187 B2 * | 2/2005 | Ito et al. | 33/1 PT |
| 6,909,282 B2 * | 6/2005 | Onishi et al. | 324/207.25 |
| 6,931,918 B2 * | 8/2005 | Herb | 73/114.26 |
| 7,000,734 B2 * | 2/2006 | Nawamoto et al. | 184/6.26 |
| 7,005,860 B2 * | 2/2006 | Yamamoto et al. | 324/527 |
| 7,161,317 B2 * | 1/2007 | Matsushita et al. | 318/432 |
| 7,187,153 B2 * | 3/2007 | Imagawa et al. | 318/638 |
| 7,209,850 B2 * | 4/2007 | Brott et al. | 702/117 |
| 7,240,761 B2 * | 7/2007 | Nagase et al. | 180/443 |
| 7,298,109 B2 * | 11/2007 | Sakamaki et al. | 318/489 |
| 7,414,425 B2 * | 8/2008 | O'Gorman et al. | 324/765.01 |
| 7,420,350 B2 * | 9/2008 | Namuduri et al. | 318/610 |
| 7,474,067 B2 * | 1/2009 | Ueda et al. | 318/432 |
| 7,504,818 B2 * | 3/2009 | Seki | 324/76.52 |
| 7,548,128 B2 * | 6/2009 | Rosik et al. | 331/116 R |
| 7,604,878 B2 * | 10/2009 | Nakatani et al. | 428/825 |
| 7,705,602 B2 * | 4/2010 | Bertness | 324/426 |
| 7,755,771 B2 * | 7/2010 | Komori et al. | 356/601 |
| 7,782,220 B2 * | 8/2010 | Nakamura et al. | 340/686.6 |
| 7,813,089 B2 * | 10/2010 | Suzuki | 361/31 |
| 7,861,421 B2 * | 1/2011 | Kobayashi et al. | 33/1 N |
| 8,148,937 B2 * | 4/2012 | Itoh et al. | 318/809 |
| 8,148,973 B2 * | 4/2012 | Nishiguchi et al. | 324/207.25 |
| 8,164,327 B2 * | 4/2012 | Hoskins et al. | 324/207.25 |
| 8,278,914 B2 * | 10/2012 | Tanaka et al. | 324/207.25 |
| 8,306,776 B2 * | 11/2012 | Ihara et al. | 702/151 |
| 2003/0169003 A1 * | 9/2003 | Cao et al. | 318/432 |
| 2004/0212359 A1 * | 10/2004 | Slater et al. | 324/76.77 |
| 2005/0022613 A1 | 2/2005 | Sakabe | |
| 2005/0030002 A1 * | 2/2005 | Shao et al. | 324/76.77 |
| 2005/0122093 A1 * | 6/2005 | Renk et al. | 324/76.77 |
| 2006/0145652 A1 * | 7/2006 | Ta et al. | 318/807 |
| 2007/0132414 A1 * | 6/2007 | Arai et al. | 318/432 |
| 2007/0268015 A1 | 11/2007 | Hatanaka et al. | |
| 2007/0289395 A1 * | 12/2007 | Hirzmann | 73/865.9 |
| 2008/0290829 A1 * | 11/2008 | Suzuki | 318/563 |
| 2010/0094507 A1 * | 4/2010 | Mitsuhara | 701/42 |
| 2010/0194385 A1 * | 8/2010 | Ronnat et al. | 324/207.25 |
| 2010/0222967 A1 * | 9/2010 | Tola et al. | 701/41 |
| 2010/0312494 A1 * | 12/2010 | Korukonda et al. | 702/38 |
| 2013/0120566 A1 * | 5/2013 | Fujii et al. | 348/135 |

FOREIGN PATENT DOCUMENTS

| | | |
|---|---|---|
| JP | 04109887 A * | 4/1992 |
| JP | A-06-127417 | 5/1994 |
| JP | A-08-210874 | 8/1996 |
| JP | A-2005-055256 | 3/2005 |
| JP | A-2007-256250 | 10/2007 |
| JP | A-2007-533975 | 11/2007 |

OTHER PUBLICATIONS

Aug. 6, 2013 Office Action issued in Japanese Patent Application No. 2009-232616 (with translation).

* cited by examiner

ROTATIONAL ANGLE (ELECTRICAL ANGLE)

|  | FIRST REGION | SECOND REGION | THIRD REGION | FOURTH REGION | FIFTH REGION | SIXTH REGION |
|---|---|---|---|---|---|---|
| P1 (bit2) | 1 | 0 | 0 | 0 | 0 | 1 |
| P2 (bit1) | 1 | 1 | 1 | 0 | 0 | 0 |
| P3 (bit0) | 1 | 1 | 0 | 0 | 1 | 1 |
| 3-bit SUM (Vsum) | 7 | 3 | 2 | 0 | 1 | 5 |

ROTATIONAL ANGLE DETECTION DEVICE AND ELECTRIC POWER STEERING SYSTEM

INCORPORATION BY REFERENCE

The disclosure of Japanese Patent Application No. 2009-232616 filed on Oct. 6, 2009 including the specification, drawings and abstract is incorporated herein by reference in its entirety.

BACKGROUND OF THE INVENTION

1. Field of the Invention

The invention relates to a rotational angle detection device and an electric power steering system.

2. Description of the Related Art

Some vehicle power steering systems execute a power assist control based on the steering angle formed by a steering wheel. Examples of power assist control executed based on the steering angle (steering speed) include a steering wheel return control for returning a steering wheel to the neutral position and a damping compensation control for restricting an abrupt change in the steering angle. The steering angle is usually detected by using, as a steering sensor, a rotational angle sensor that outputs ABZ-phase pulse signals as described in Japanese Patent Application Publication No. 6-127417 (JP-A-6-127417).

However, such a pulse-type rotational angle sensor has a problem that it is difficult to achieve both an increase in the detection accuracy and downsizing. Therefore, for example, Japanese Patent Application Publication No. 2007-256250 (JP-A-2007-256250) suggests a rotational angle sensor that includes a magnetic detection element and is able to output a sine signal and a cosine signal of which the output levels change in accordance with the rotational angle of a detection target. If such a magnetic rotational angle sensor is used as a steering sensor, it is possible to detect the steering angle with a high degree of accuracy while downsizing the steering sensor.

The rotational angle that is detected based on signals output from a rotational sensor is basically a relative angle (electrical angle) of a rotary shaft, which is a detection target, within a range of 360° in mechanical angle, whereas the steering angle formed by the rotation of a steering wheel is an absolute angle that may fall outside the range of 360° in mechanical angle. Therefore, in many cases, the steering angle is detected by counting changes in the relative angle that is detected based on the signals output from a steering sensor.

However, in order to detect the rotational angle based on a sine signal and a cosine signal as described above, it is necessary to execute A/D conversion or a complicated calculation process which is not required in the conventional rotational angle detection based on pulse signals. Therefore, if the above-described counting of changes in the relative angle is continued even after an ignition is turned off in order to ensure the continuity of the steering angle detection within a period from when the ignition is turned off until when the ignition is turned on again, the power consumption increases, resulting in acceleration of exhaustion of an in-vehicle power supply.

To address this problem, each of JP-A-2007-256250 and Published Japanese Translation of PCT application No. 2007-533975 suggests a rotational angle detection device in which the axial distance between a magnetic rotor and a magnetic detection element that constitute a rotational angle sensor is changed based on the absolute angle. Thus, the vector length of the density of magnetic flux that passes through the magnetic detection element is continuously changed based on the absolute angle. As a result, it is possible to detect the absolute angle without counting changes in the rotational angle.

However, providing such a mechanical configuration for changing the above-described axial distance complicates the structure, resulting in an increase in the production cost. Further, the presence of such a movable portion where the axial distance is changed may become a factor of reduction in the reliability. On this point, there is still room for improvement.

SUMMARY OF INVENTION

It is an object of the invention to provide a rotational angle detection device and an electric power steering system that are simply structured, that have high degree of detection accuracy, and that are able to continuously detect an absolute angle of a detection target with a small amount of electric power.

An aspect of the invention relates to a rotational angle detection device that includes: a rotational angle sensor that outputs a sine signal and a cosine signal of which output levels are changed in accordance with a rotational angle of a detection target; a first rotational angle detector that detects the rotational angle based on the sine signal and the cosine signal; a pulse signal generator that generates, based on the sine signal and the cosine signal, three-phase pulse signals that have edges corresponding to predetermined rotational angles and that are set in such a manner that the predetermined rotational angles do not overlap each other and are at regular intervals; and a second rotational angle detector that detects the rotational angle based on the pulse signals.

It is possible to detect changes in the rotational angle of the detection target with an accuracy of electrical angle corresponding to the number of edges that are generated in a range of 360° in electrical angle (for example, with an accuracy of 60° in electrical angle when the number of edges is 6), by detecting the edges (trailing edges and rising edges) in the three-phase pulse signals. It is possible to detect the absolute angle by counting the accumulated changes in the rotational angle. In the detection of rotational angle based on the pulse signals, A/D conversion and a complicated calculation process are not required, unlike the detection of rotational angle based on the sine signal and the cosine signal.

Accordingly, with the configuration described above, it is possible to detect the absolute angle with a high degree of accuracy based on the sine signal and the cosine signal with the use of the first rotational angle detector. In addition, while the first rotational angle detector is stopped, it is possible to continue the detection of absolute angle by executing the detection based on the three-phase pulse signals with the use of the second rotational angle detector while suppressing power consumption. As a result, it is possible to continuously detect the absolute angle of the detection target with a simple configuration and a small amount of electric power.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
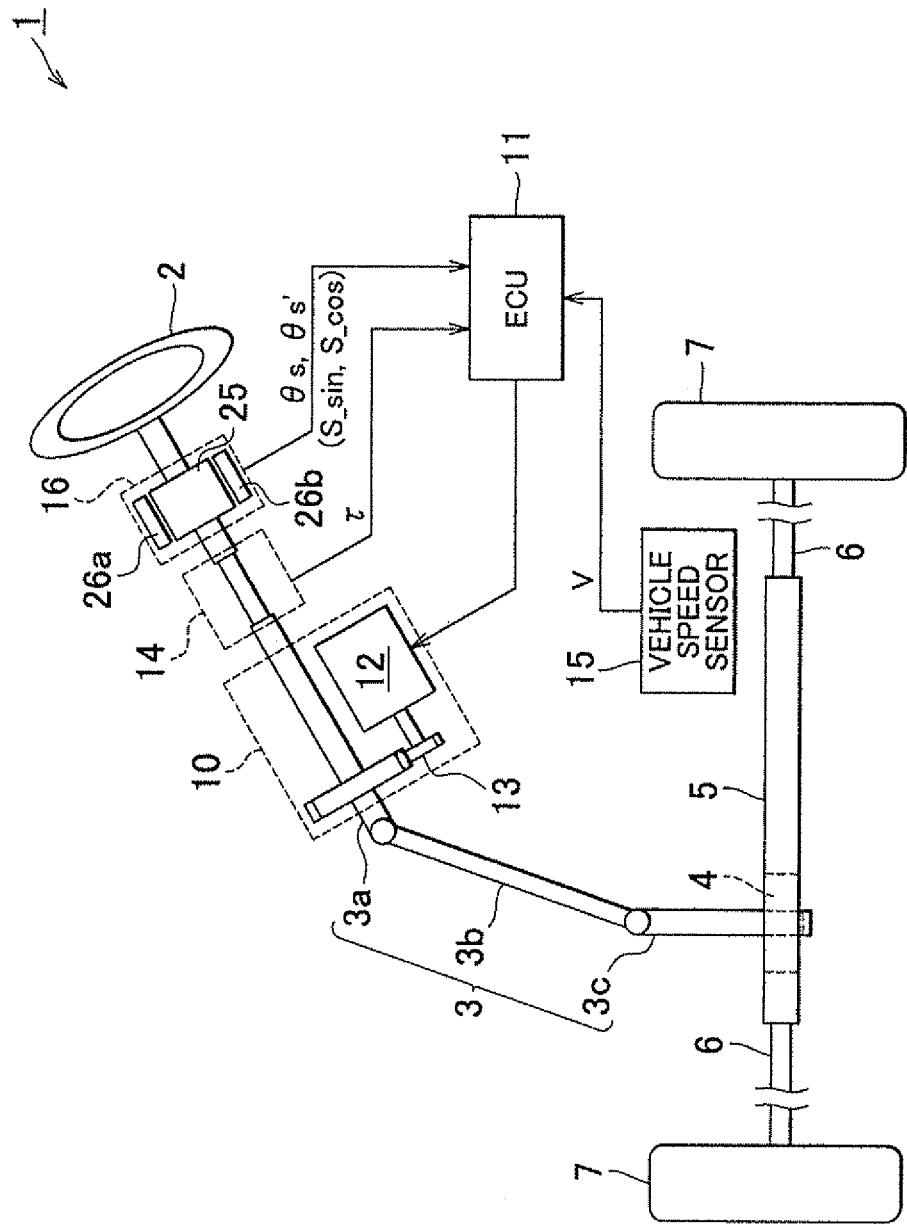
FIG. 1 is a view schematically showing the structure of an electric power steering system (EPS)

Hereafter, a first embodiment of the invention will be described with reference to the accompanying drawings. As shown in FIG. 1, in an electric power steering system (EPS) 1 according to the first embodiment, a steering shaft 3 to which a steering wheel 2 is secured is connected to a rack shaft 5 via a rack-and-pinion mechanism 4. The rotation of the steering shaft 3 caused by a steering operation is converted into a linear reciprocation motion of the rack shaft 5 by the rack-and-pinion mechanism 4. The steering shaft 3 is formed by connecting a column shaft 3a, an intermediate shaft 3b and a pinion shaft 3c to each other. The linear motion of the rack shaft 5 caused by the rotation of the steering shaft 3 is transmitted to knuckles (not shown) via tie-rods 6 connected to respective ends of the rack shaft 5. As a result, the steering angle of steered wheels 7, that is, the direction in which a vehicle travels is changed.

The EPS 1 includes an EPS actuator 10 and an ECU 11. The EPS actuator 10 serves as a steering force assisting device that supplies a steering system with an assist force for assisting a steering operation. The ECU serves as a control unit that controls the operation of the EPS actuator 10.

The EPS actuator 10 is formed as a column assist-type EPS actuator in which a motor 12 that serves as a drive source is drivably connected to the column shaft 3a via a speed reduction mechanism 13. A direct-current motor with a brush is used as the motor 12. The EPS actuator 10 is configured such that the rotational speed of the motor 12 is reduced and the rotation having the reduced rotational speed is transmitted to the column shaft 3a to supply the motor torque to the steering system as an assist force.

A torque sensor 14, a vehicle speed sensor 15 and a steering sensor (steering angle sensor) 16 are connected to the ECU 11. The ECU 11 detects the steering torque τ, the vehicle speed V, and the steering angle θs based on sensor signals output from these sensors. The ECU 11 in the first embodiment controls an electric current that is supplied to the motor 12 that serves as the drive source based on the above-described state amounts to control the operation of the EPS actuator 10, thereby controlling the assist force that is applied to the steering system (power assist control).

Figure 2:
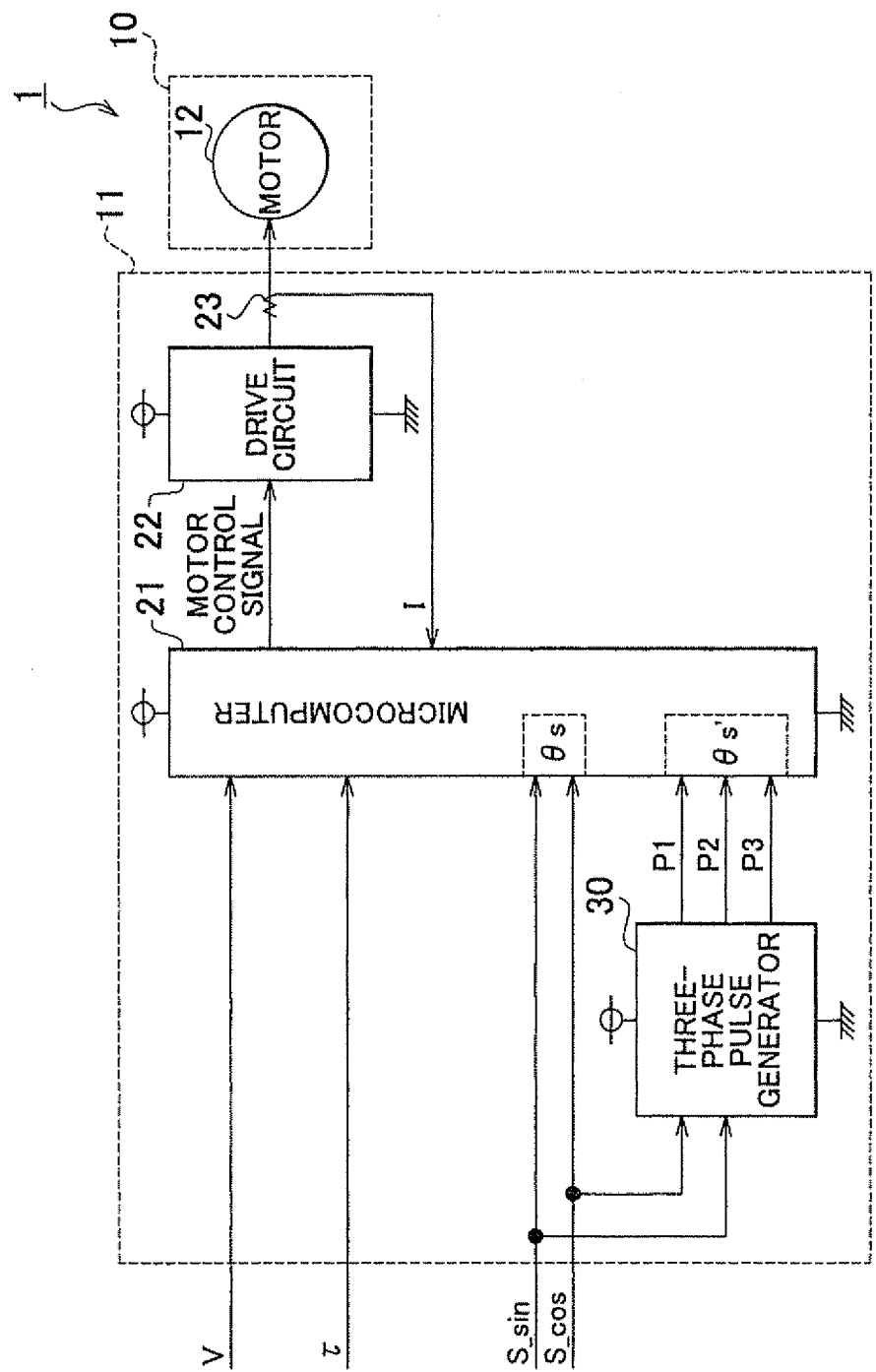
FIG. 2 is a block diagram schematically showing the electrical configuration of the EPS.

More specifically, as shown in FIG. 2, the ECU 11 includes a microcomputer 21 and a drive circuit 22 that supplies a drive current to the motor 12 based on a motor control signal that is output from the microcomputer 21. The sensor signals output from the above-described sensors are input in the microcomputer 21. The microcomputer 21 is configured to output a motor control signal used to execute the power assist control based on the steering torque τ, the vehicle speed V, and the steering angle θs detected based on the sensor signals.

The microcomputer 21 calculates a basic component of a target assist force that should be applied to the steering system based on the detected steering torque τ and vehicle speed V. In addition, the microcomputer 21 calculates various compensation components based on the detected steering angle θs. Examples of the compensation components calculated based on the detected steering angle θs include a steering wheel return compensation component for returning the steering wheel 2 to the neutral position and a damping compensation component for restricting an abrupt change in the steering angle. The microcomputer 21 calculates a current command value that corresponds to the basic component of the target assist force and the compensation components.

The microcomputer 21 detects the actual current I that is actually supplied to the motor 12 based on a signal output from a current sensor 23, and executes a current feedback control so that the actual current I is brought to the current command value. Thus, the microcomputer 21 generates a motor control signal that is output to the drive circuit 22. The ECU 11 executes the power assist control by supplying the drive current based on the motor control signal to the motor 12.

Next, the manner of detecting a steering angle according to the first embodiment will be described.

As shown in FIG. 1, as the steering sensor 16, a magnetic rotational angle sensor that includes a magnetic rotor 25 and two magnetic detection elements (hall IC) 26a and 26b is used. The magnetic rotor 25 rotates together with the column shaft 3a to which the steering wheel 2 is secured. The magnetic detection elements (hall IC) output sensor signals that correspond to a change in the magnetic flux, which is caused by the rotation of the magnetic rotor 25.

The magnetic detection elements 26a and 26b are configured to output sensor signals of which the output levels change in accordance with the rotational angle of the column shaft 3a provided with the magnetic rotor 25, that is, the steering angle θs formed by the steering wheel 2. The phases of these sensor signals are offset from each other by ¼ period (electrical angle of 90°).

The steering sensor 16 outputs two sensor signals output from the magnetic detection elements 26a and 26b to the ECU 11 as the sine signal S_sin and the cosine signal S_cos. The ECU 11 (microcomputer 21) that constitutes a first rotational angle detector detects the steering angle θs that is an absolute angle based on the received sine signal S_sin and cosine signal S_cos.

Figure 3:
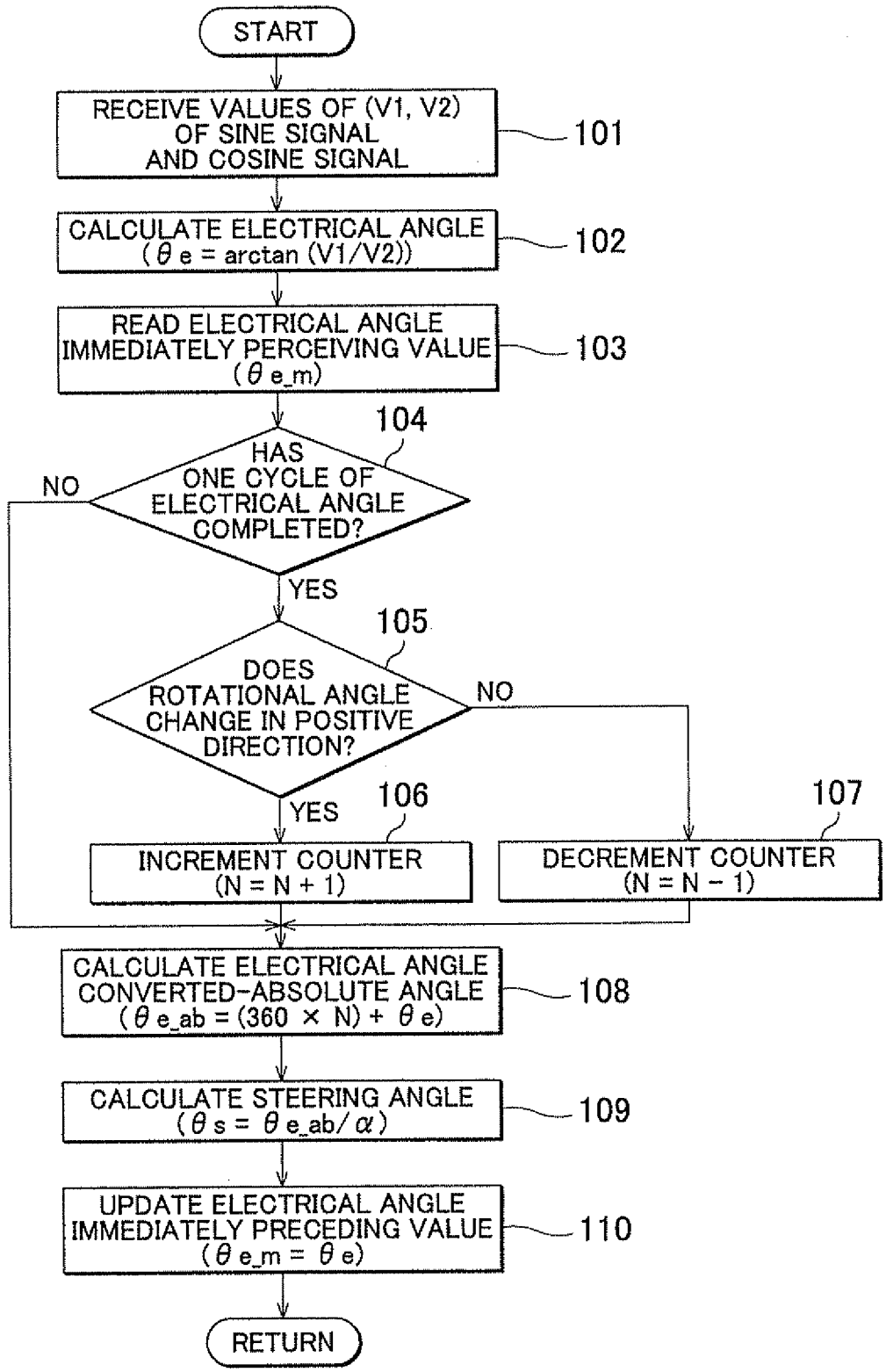
FIG. 3 is a flowchart showing the steps of steering angle detection based on a sine signal and a cosine signal.

More specifically, as shown in the flowchart in FIG. 3, the microcomputer 21 receives the value V1 and the value V2 of the sine signal S_sin and the cosine signal S_cos that are output from the steering sensor 16 (step 101), and then calculates the electrical angle θe that corresponds to the values V1 and V2 according to Equation 1 (step 102). In Equation 1, arctan represents an arc tangent.

$$\theta e = \arctan(V1/V2) \qquad \text{Equation 1}$$

Next, the microcomputer 21 reads the value of the electrical angle calculated in the immediately preceding calculation cycle, that is, the electrical angle immediately preceding value θe_m from a memory (not shown) (step 103). Then, the microcomputer 21 determines whether the electrical angle θe indicates that one cycle of electrical angle (one cycle of 360° in electrical angle) has been completed based on the comparison between the electrical angle immediately preceding value θe_m and the electrical angle θe calculated in step 102 (step 104).

That is, because the electrical angle θe is a relative angle, if the value exceeds 359° and keeps increasing, the subsequent value in the positive direction is 0°. Similarly, if the value falls below 0° and keeps decreasing, the subsequent value in the negative direction is 359°. In the first embodiment, the state where the electrical angle θe passes 0° (360°) that is a changing point is defined as the state where "one cycle of electrical angle has been completed". In step 104, it is determined whether the electrical angle θe calculated in the current calculation cycle indicates that one cycle of electrical angle has been completed. Then, by counting the number of cycles of electrical angle that have been completed, the microcomputer 21 calculates the absolute electrical angle (electrical angle converted-absolute angle θe_ab) of a rotary shaft that rotates together with the steering wheel 2 which is a detection target, that is, the column shaft 3a provided with the steering sensor 16.

More specifically, when the value of the electrical angle θe indicates that one cycle of electrical angle has been completed ("YES" in step 104) and the value changes in the positive direction, that is, when the value of the electrical angle ηe is 0° and the electrical angle immediately preceding value θe_m is 359° ("YES" in step 105), the microcomputer 21 increments a counter that counts the number of cycles (N=N+1: step 106). When the value changes in the negative direction, that is, when the value of the electrical angle θe is 359° and the electrical angle immediately preceding value θe_m is 0° ("NO" in step 105), the microcomputer 21 decrements the counter (N=N−1: step 107). If it is determined in step 104 that the value of the electrical angle θe does not indicates that one cycle of electrical angle has been completed ("NO" in step 104), steps 105 to 107 are not executed. Then, the microcomputer 21 calculates the electrical angle converted-absolute angle θe_ab of the column shaft 3a provided with the steering sensor 16 based on the count value N that indicates the thus counted number of cycles of electrical angle 360° and the electrical angle θe (θe_ab=(360×N)+θe: step 108).

The microcomputer 21 converts the electrical angle converted-absolute angle θe_ab calculated in step 108 into a mechanical angle, that is, calculates the steering angle θs that is an absolute angle in mechanical angle, by dividing the electrical angle converted-absolute angle θe_ab by the electrical angle magnification α (θs=θe_ab/α: step 109). After calculation of the steering angle θs, the electrical angle immediately preceding value θe_m is updated (θe=θe_m: step 120).

The microcomputer 21 is configured to use, in the power assist control, the steering angle θs that is detected (calculated) based on the sine signal S_sin and the cosine signal S_cos output from the steering sensor 16.

Figure 4:
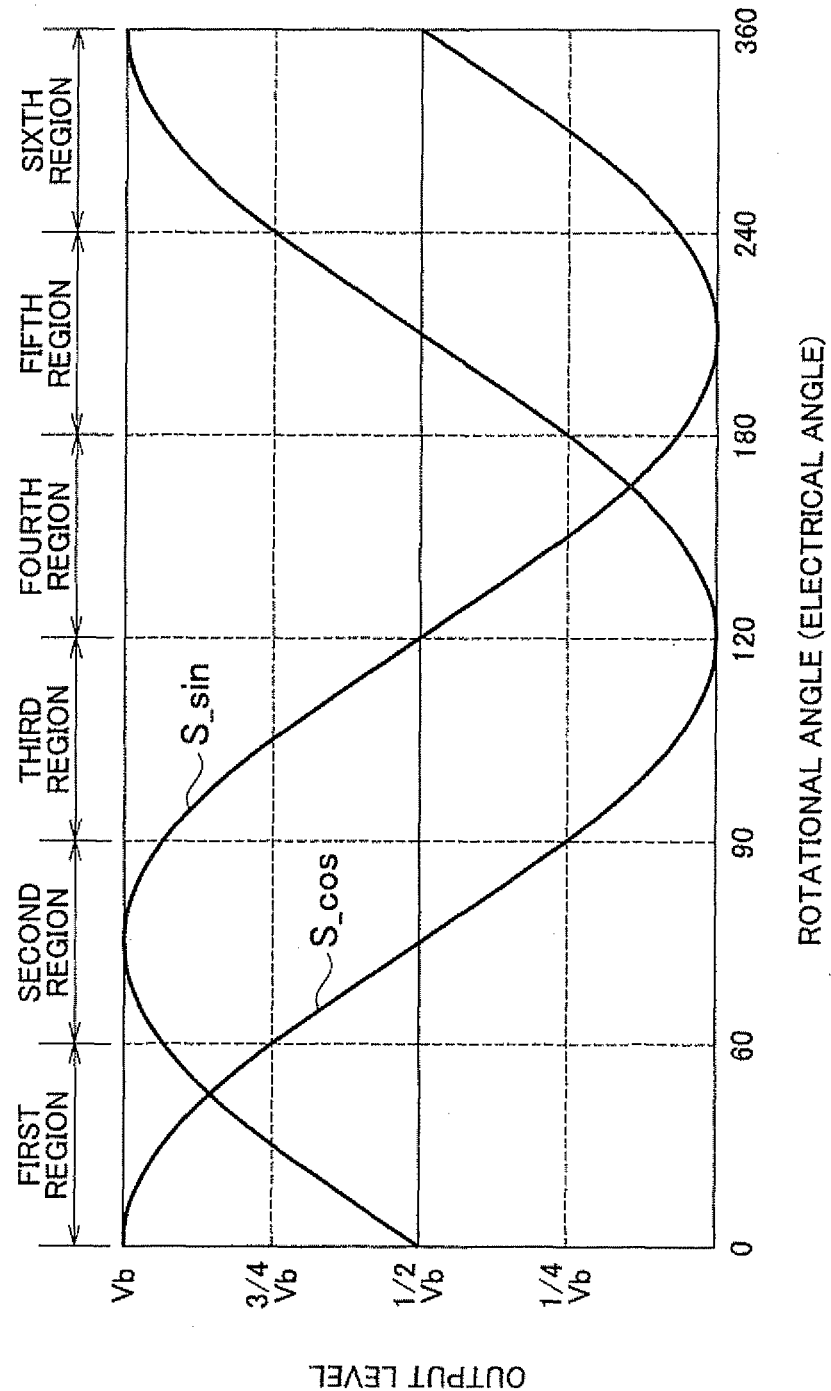
FIG. 4 is a graph illustrating the relationship between the waveforms of the sine signal and the cosine signal and the output levels of voltage-dividing signals.
Figures 5, 6:
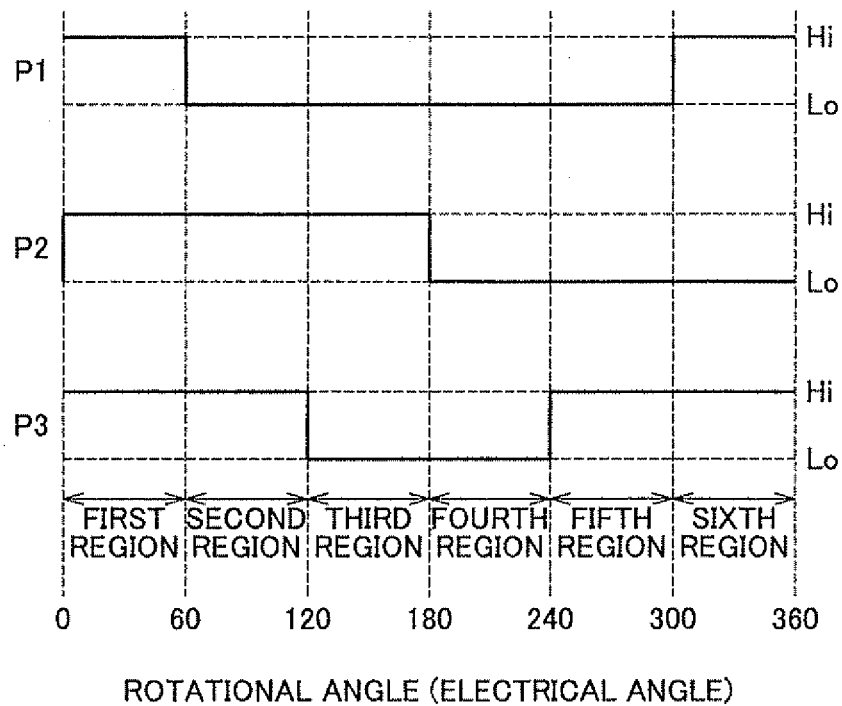
FIG. 5 is a graph illustrating the waveforms of three-phase pulse signals that are generated based on the sine signal and the cosine signal, and regions (first region to sixth region) that are defined by predetermined rotational angles that correspond to edges in the three-phase pulse signals.
FIG. 6 is a table that shows the correspondence relationship between the sum of 3-bit signal (binary number) based on the output levels of the three-phase pulse signals and the regions.

As shown in FIG. 2, the ECU 11 includes a three-phase pulse generator 30 that generates three-phase pulse signals P1, P2 and P3 which have edges that correspond to predetermined rotational angles (electrical angles) shown in FIG. 5, based on the sine signal S_sin of which the output level changes sinusoidally and the cosine signal S_cos of which the output level changes in a cosine-wave manner as shown in FIG. 4.

More specifically, the pulse signal P1 has a trailing edge and a rising edge at 60° and 300°, respectively, the pulse signal P2 has a trailing edge and a rising edge at 180° and 0° (360°), respectively, and the pulse signal P3 has a trailing edge and a rising edge at 120° and 240°, respectively. The microcomputer 21 has a function as a second rotational angle detector that calculates the steering angle (second steering angle θs') formed by the steering wheel 2 based on the three-phase pulse signals P1, P2 and P3 that are set in such a manner that the predetermined rotational angles corresponding to the respective edges do not overlap each other and are at regular intervals.

As shown in FIGS. 5 and 6, the microcomputer 21 recognizes the pulse signals P1, P2 and P3 that are output from the three-phase pulse generator 30 as 3-bit signals. When the output level of each of the pulse signals P1, P2 and P3 is high, the pulse signal indicates 1. When the output level of each of the pulse signals P1, P2 and P3 is low, the pulse signal indicates 0. More specifically, in the first embodiment, the pulse signal P1 corresponds to bit 2, the pulse signal P2 corresponds to bit 1, and the pulse signal P3 corresponds to bit 0. Then, the microcomputer 21 calculates the absolute electrical angle (second electrical angle converted-absolute angle θe_ab') of the rotary shaft that rotates together with the steering wheel 2 that is the detection target, that is, the column shaft 3a provided with the steering sensor 16, based on the sum of the 3-bit signals (3-bit sum Vsum (binary number)).

As described above, the predetermined rotational angles corresponding to the edges (trailing edges and rising edges) in the pulse signals P1, P2 and P3 are set so as not to overlap with each other and so as to be at regular intervals (see FIG. 5). Therefore, the 3-bit sum Vsum of the pulse signals P1, P2 and P3 indicates specific values corresponding to the regions (first region to sixth region) that are defined by predetermined rotational angles corresponding to the respective edges.

More specifically, as shown in FIG. 6, the 3-bit sum Vsum is 7 in the first region (0° (360°) to 60°), 3 in the second region (60° to 120°), and 2 in the third region (120° to 180°). Similarly, the 3-bit sum Vsum is 0 in the fourth region (180° to 240°), 1 in the fifth region (240° to 300°), and 5 in the sixth region (300° to 360°).

Based on this fact, the microcomputer 21 detects the rotational angle of the column shaft 3a provided with the steering sensor 16, that is, the steering angle formed by the steering wheel 2 (second steering angle θs') with an accuracy of 60° in electrical angle, and counts changes in the rotational angle, thereby calculating the second electrical angle converted-absolute angle θe_ab'. Then, the microcomputer 21 converts the second electrical angle converted-absolute angle θe_ab' into a mechanical angle, thereby calculating the second steering angle θs' that is the steering angle detected based on the pulse signals P1, P2 and P3.

Figure 7:
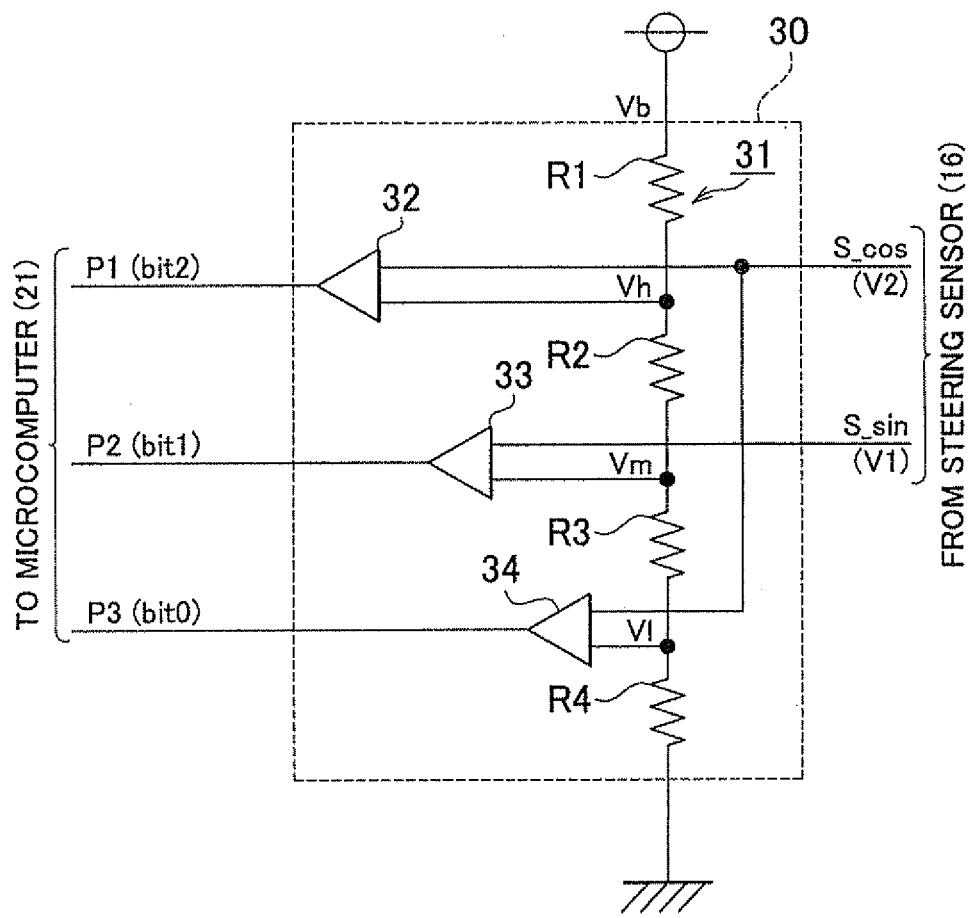
FIG. 7 is a circuit diagram of a three-phase pulse generator.

More specifically, as shown in FIG. 7, the three-phase pulse generator 30 includes a voltage-dividing circuit 31 and three comparators 32, 33 and 34. The voltage-dividing circuit 31 is formed by connecting four resistances R1 to R4, of which the resistance values are equal to each other, in series. The comparator 32, 33 and 34 receive voltage-dividing signals (Vh, Vm, Vl) that are output from the voltage-dividing circuit 31 and that have output levels equal to the divided voltages between the resistances R1 and R2, the resistances R2 and R3, and the resistances R3 and R4, respectively.

The voltage Vb that corresponds to the maximum value of the values V1 and V2 indicating the output levels of the sine signal S_sin and the cosine-signal S_cos is applied to the voltage-dividing circuit 31 (see FIG. 4). Each of the comparator 32, 33 and 34 receives corresponding one of the corresponding sine signal S_sin and cosine-signal S_cos. More specifically, the comparator 32 receives the high potential signal Vh that is a voltage-dividing signal having an output level equal to the divided voltage (¾×Vb) between the resistances R1 and R2 that are arranged in the highest potential side (power supply side) of the voltage-dividing circuit 31, and the cosine signal S_cos. The comparator 33 receives the medium potential signal Vm that has an output level equal to the divided voltage (½×Vb) between the resistances R2 and R3, and the sine signal S_sin. The comparator 34 receives the low potential signal V1 that has an output level equal to the divided voltage (¼×Vb) between the resistances R3 and R4 that are arranged in the lowest potential side (ground side) of the voltage-dividing circuit 31, and the cosine signal S_cos. The three-phase pulse generator 30 outputs signals that are output from the comparators 32, 33 and 34 based on the comparison between the received two signals, as the pulse signals P1, P2 and P3, respectively.

That is, as shown in FIG. 4, the regions where the output level (value V2) of the cosine signal S_cos exceeds the output level of the high potential signal Vh (¾×Vb) are the first region and the sixth region. The regions where the output level (value V2) of the cosine signal S_cos exceeds the output level of the low potential signal V1 (¼×Vb) are the first region, the second region, the fifth region, and the sixth region. The regions where the output level (value V1) of the sine signal S_sin exceeds the output level of the medium potential signal Vm (½×Vb) are the first region, the second region and the third region. The outputs from the comparators 32, 33 and 34, which indicate high in the first and sixth regions, the first, second, fifth and sixth regions, and the first, second and third regions, respectively, are input in the microcomputer 21, as the pulse signals P1, P2 and 3 (see FIG. 5).

The microcomputer 21 monitors changes in the rotational angle formed by the steering wheel 2 that is the detection target, based on the pulse signals P1, P2 and P3 while the ignition is off, thereby continuing the detection of steering angle based on the pulse signals P1, P2 and P3.

More specifically, when the ignition is turned off, the microcomputer 21 stops main calculation processes and enters a sleep mode. The microcomputer 21 has a function of automatically restarting in response to detection of an edge in one of the received pulse signals P1, P2 and P3.

When an edge is detected in one of the pulse signals P1, P2 and P3 in the sleep mode, the microcomputer 21 restarts in a power-saving mode, using the function as a starting unit. The microcomputer 21 is configured to continue the detection of steering angle based on the pulse signals P1, P2 and P3, more specifically, counting of changes in the rotational angle formed by the steering wheel 2 that is the detection target.

Figure 8:
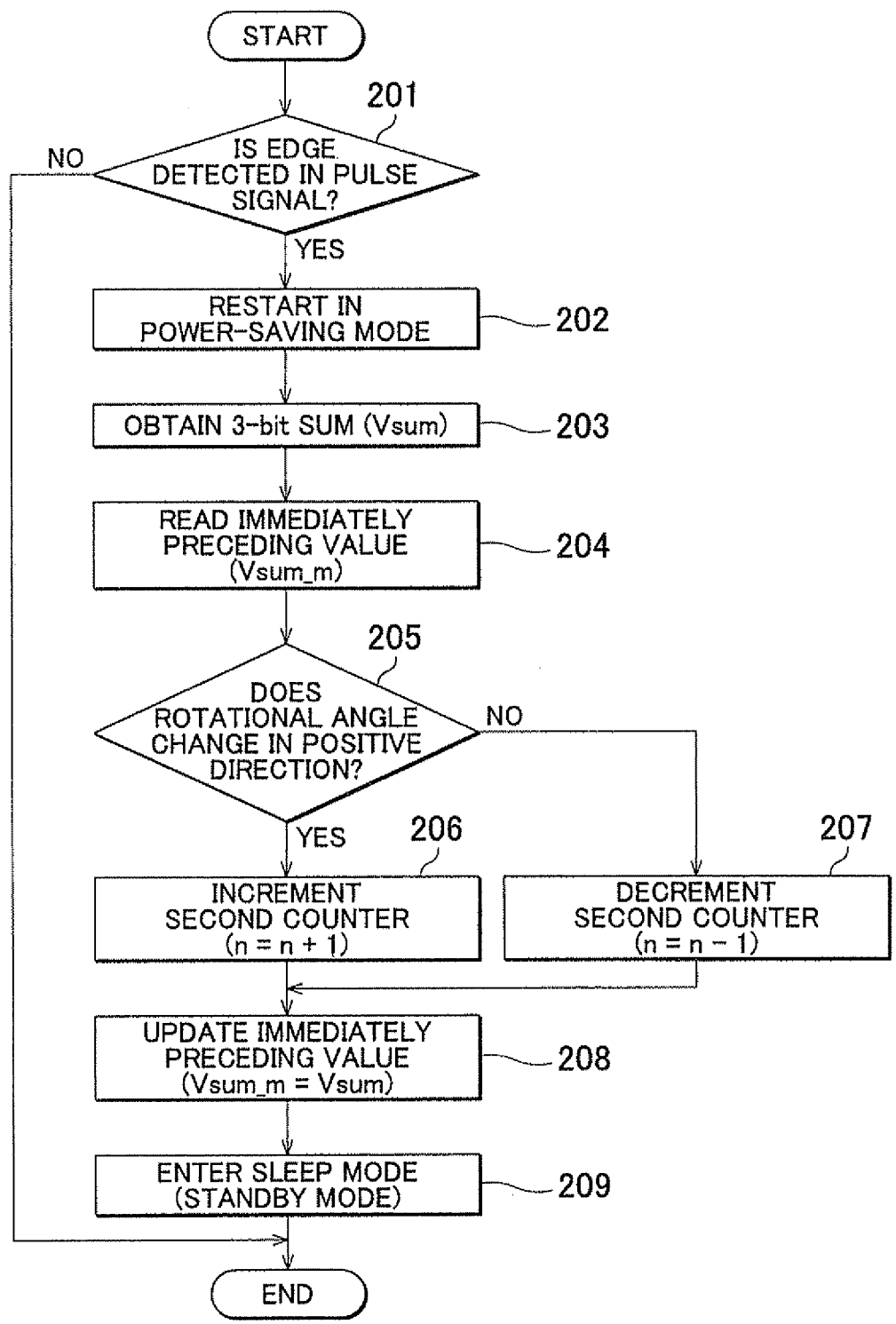
FIG. 8 is a flowchart showing the steps of steering angle detection that is continuously executed based on the three-phase pulse signals when an ignition is off.

More specifically, as shown in the flowchart in FIG. 8, when the microcomputer 21 detects an edge in one of the pulse signals P1, P2 and P3 that are received from the three-phase pulse generator 30 as described above ("YES" in step 201), the microcomputer 21 restarts in the power-saving mode in order to detect the steering angle based on the pulse signals P1, P2 and P3 (step 202).

When the microcomputer 21 is in the power-saving mode, electric power is supplied to the minimum configurations that are required to detect the steering angle based on the pulse signals P1, P2 and P3. Therefore, electric power supply to portions that constitutes the first steering angle detector that detects the steering angle based on the sine signal S_sin and the cosine signal S_cos is kept stopped. Examples of the above-described portions include an A/D converter embedded in the microcomputer 21 to obtain the values V1 and V2 (output levels) of the sine signal S_sin and the cosine signal S_cos that are received as an analog sine signal and an analog cosine signal.

If no edge is detected in the pulse signals P1, P2 and P3 in step 201 ("NO" in step 201), step 202 and the following steps are not executed.

Next, the microcomputer 21 obtains the 3-bit sum Vsum of the pulse signals P1, P2 and P3 (step 203), and reads, from the memory, the immediately preceding value of the 3-bit sum Vsum_m that is obtained when the microcomputer 21 restarts in the power-saving mode last time (step 204). Then, the microcomputer 21 determines whether the rotational angle changes in the positive direction or the negative direction based on the 3-bit sum Vsum and the immediately preceding value Vsum_m.

Generation of an edge in one of the pulse signals P1, P2 and P3 indicates shifting of the rotational angle from one region to another region among the regions each of which has a range of 60° in electrical angle, which can be determined based on the pulse signals P1, P2 and P3 (see the first to sixth regions in FIGS. 4 to 6). That is, generation of an edge in one of the pulse signals P1, P2 and P3 indicates a change in the rotational angle of the steering wheel 2 that is the detection target (column shaft 3a provided with the steering sensor 16). Therefore, it is possible to determine the rotational direction based on the 3-bit sum Vsum and the immediately preceding value Vsum_m.

For example, when the 3-bit sum Vsum calculated through the current calculation is 2 (see FIG. 6), if the immediately preceding value Vsum_m is 3, it is determined that the rotational angle changes in the positive direction, whereas if the immediately preceding value Vsum_m is 0, it is determined that the rotational angle changes in the negative direction. The microcomputer 21 detects (counts) a change in the rotational angle detected based on generation of an edge in one of the pulse signals P1, P2 and P3 by determining the direction in which the rotational angle changes.

More specifically, if it is determined that the rotational angle changes in the positive direction ("YES" in step 205), the microcomputer 21 increments the second counter that counts changes in the rotational angle with an accuracy of 60° in electrical angle (n=n+1: step 206), whereas if it is determined that the rotational angle changes in the negative direction ("NO" in step 205), the microcomputer 21 decrements the second counter (n=n−1: step 207).

After counting changes in the rotational angle in step 206 or step 207, the microcomputer 21 updates the immediately preceding value Vsum_m to the 3-bit sum Vsum obtained through the current calculation (Vsum_m=Vsum: step 208).

Then, the microcomputer 21 is placed in the sleep mode again (step 209). In this way, it is possible to monitor whether an edge is generated in one of the pulse signals P1, P2 and P3 with a considerably small amount of electric power.

When the microcomputer 21 is activated because the ignition is turned on, the second steering angle θs' is calculated based on the pulse signals P1, P2 and P3 by using the value of the second counter, which is continuously updated while the ignition is off, that is, the second count value n that indicates the accumulated changes in the rotational angle with an accuracy of 60° in electrical angle. Then, the microcomputer 21 corrects the initial value of the steering angle θs, which is detected based on the sine signal S_sin and the cosine signal S_cos, using the second steering angle θs'. In this way, it is possible to ensure the continuity (reproducibility) of the steering angle detection within a period from when the ignition is turned off until when the ignition is turned on again.

Figure 9:
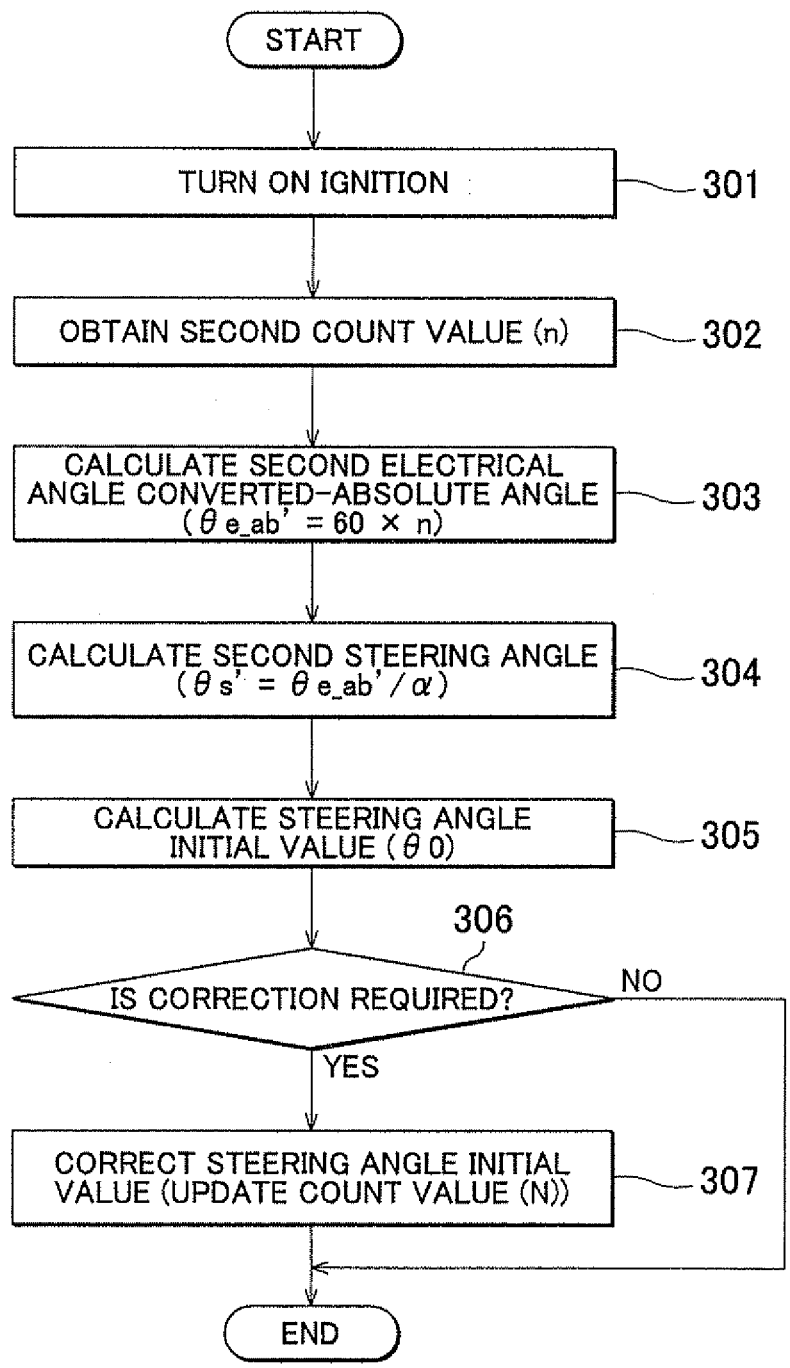
FIG. 9 is a flowchart showing the steps of detection of a second steering angle based on the three-phase pulse signals, executed at the time of activation caused when the ignition is turned on, and correction of a steering angle initial value based on the sine signal and the cosine signal and with the use of the second steering angle.

More specifically, as shown in FIG. 9, when the microcomputer 21 is activated because the ignition is turned on (step 301), the microcomputer 21 obtains the second count value n that is continuously updated while the ignition is off (step 302).

Next, the microcomputer 21 calculates the second electrical angle converted-absolute angle θe_ab' that is the absolute electrical angle of the steering wheel 2 which is the detection target (the column shaft 3a provided with the steering sensor 16), using the second count value n that indicates the accumulated changes in the rotational angle with an accuracy of 60° in electrical angle (θe_ab'=60×n: step 303). Then, the microcomputer 21 calculates the second steering angle θs' that is the steering angle that is detected based on the pulse signals P1, P2 and P3, by converting the second electrical angle converted-absolute angle θe_ab' into a mechanical angle, that is, by dividing the second electrical angle converted-absolute angle θe_ab' by the electrical angle magnification α (θs'=θe_ab'/α: step 304).

Next, the microcomputer 21 calculates the steering angle initial value θ0 that is the initial value of the steering angle θs that is detected based on the sine signal S_sin and the cosine signal S_cos (step 305). The steering angle initial value θ0 is calculated in the same process as that for detecting the steering angle θs based on the sine signal S_sin and the cosine signal S_cos (see FIG. 3). Then, the microcomputer 21 compares the steering angle initial value θ0 with the second steering angle θs' based on the three-phase pulse signals P1, P2 and P3, which is detected (calculated) in step 304. In this way, the microcomputer 21 determines whether the steering angle initial value θ0 should be corrected (step 306).

Whether the steering angle initial value θ0 should be corrected is determined by determining whether the steering angle initial value θ0 deviates from the second steering angle θs', which is a comparison target, by 360° or more in electrical angle. If it is determined that the steering angle initial value θ0 should be corrected ("YES" in step 306), the count value N, which is used as the basis of the calculation of the steering angle initial value θ0, is updated based on the comparison between the steering angle initial value θ0 and the second steering angle θs', that is, the number of cycles of the electrical angle 360° is updated. In this way, the steering angle initial value θ0 is corrected (step 307).

According to the first embodiment, the following effects are produced. 1) The ECU 11 (microcomputer 21) detects the steering angle θs that is the absolute angle based on the sine signal S_sin and the cosine signal S_cos that are output from the steering sensor 16 formed of a magnetic rotational angle sensor. The ECU 11 includes the three-phase pulse generator 30 that generates the three-phase pulse signals P1, P2 and 3 based on the sine signal S_sin and the cosine signal S_cos. The three-phase pulse signals P1, P2 and P3 have edges corresponding to the predetermined rotational angles (electrical angles), and are set in such a manner that the predetermined rotational angles corresponding to the respective edges do not overlap each other and are at regular intervals. The microcomputer 21 has a function as the second rotational angle detector that calculates the steering angle (second steering angle θs') based on the pulse signals P1, P2 and P3.

That is, it is possible to detect a change in the rotational angle of the column shaft 3a provided with the steering sensor 16 with an accuracy of 60° in electrical angle by detecting an edge (rising edge or trailing edge) in the pulse signals P1, P2 and P3. Further, it is possible to detect the steering angle (second steering angle θs') of the steering wheel 2, which is an absolute angle, by counting the accumulated changes in the rotational angle. In the detection of the rotational angle based on the pulse signals, A/D conversion and a complicated calculation are not required unlike the detection of rotational angle based on the sine signal S_sin and the cosine signal S_cos.

Accordingly, with the configuration described above, it is possible to detect the steering angle θs with a high degree of accuracy by executing detection based on the sine signal S_sin and the cosine signal S_cos. In addition, while the ignition is off, it is possible to continue detection of the steering angle (second steering angle θs') by executing detection based on the three-phase pulse signals P1, P2 and P3 with small power consumption. As a result, it is possible to ensure the continuity (reproducibility) of the steering angle detection within a period from when the ignition is turned off until when the ignition is turned on again with a simple configuration and smaller amount of electric power.

2) When the microcomputer 21 is activated because the ignition is turned on, the microcomputer 21 corrects the initial value of the steering angle θs that is detected based on the sine signal S_sin and the cosine signal S_cos, using the second steering angle θs' that is the second rotational angle which is detected based on the pulse signals P1, P2 and P3. Thus, from immediately after the microcomputer 21 is activated again, it is possible to detect the steering angle θs with a high degree of accuracy.

3) The microcomputer 21 has a function as the restarting unit that automatically restarts in response to detection of an edge in one of the pulse signals P1, P2 and P3 when the microcomputer 21 is in the sleep mode because the ignition is off.

That is, the detection of rotational angle based on the pulse signals is executed in response to detection of an edge. When an edge is not detected, no calculation process is particularly required. Therefore, with the configuration described above, it is possible to save a lot of electric power while continuously detecting the steering angle.

4) The three-phase pulse generator 30 includes the voltage-dividing circuit 31 formed by connecting the four resistances R1 to R4, of which the resistance values are equal to each other, in series, and the three comparators 32, 33 and 34 that receive voltage-dividing signals (Vh, Vm, Vl) that have output levels equal to the divided voltages between the resistances R1 and R2, the resistances R2 and R3, and the resistances R3 and R4, respectively. The voltage Vb corresponding to the maximum value of the values V1 and V2 that indicate the output levels of the sine signal S_sin and the cosine signal S_cos is applied to the voltage-dividing circuit 31. The comparator 32 receives the high potential signal Vh that is output from the voltage-dividing circuit 31 as a voltage-dividing signal, and the cosine signal S_cos. The comparator 33 receives the medium potential signal Vm as a voltage-dividing signal, and the sine signal S_sin. The comparator 34 receives the low potential signal Vl as a voltage-dividing signal, and the cosine signal S_cos. The three-phase pulse generator 30, which serves as a pulse signal generator, outputs signals that are output from the comparators 32, 33 and 34 based on the comparison between the received two signals, as the pulse signals P1, P2 and P3, respectively.

With the simple configuration described above, it is possible to generate, with a small amount of electric power, the three-phase pulse signals P1, P2 and P3 that have the edges corresponding to the predetermined rotational angles (electrical angles) and that are set in such a manner that the predetermined rotational angles corresponding to the respective edges do not overlap each other and are at regular intervals.

Hereafter, a second embodiment of the invention will be described with reference to the accompanying drawings. Note that, the same portions as those in the first embodiment will be denoted by the same reference numerals as those in the first embodiment, and the detailed description thereof will not be provided below.

After the microcomputer 21 is activated because the ignition is turned on, the microcomputer 21 detects the steering angle θs based on the sine signal S_sin and the cosine signal S_cos output from the steering sensor 16 (see FIG. 3), and detects the second steering angle θs' based on the three-phase pulse signals P1, P2 and P3 generated by the three-phase pulse generator 30.

Figure 10:
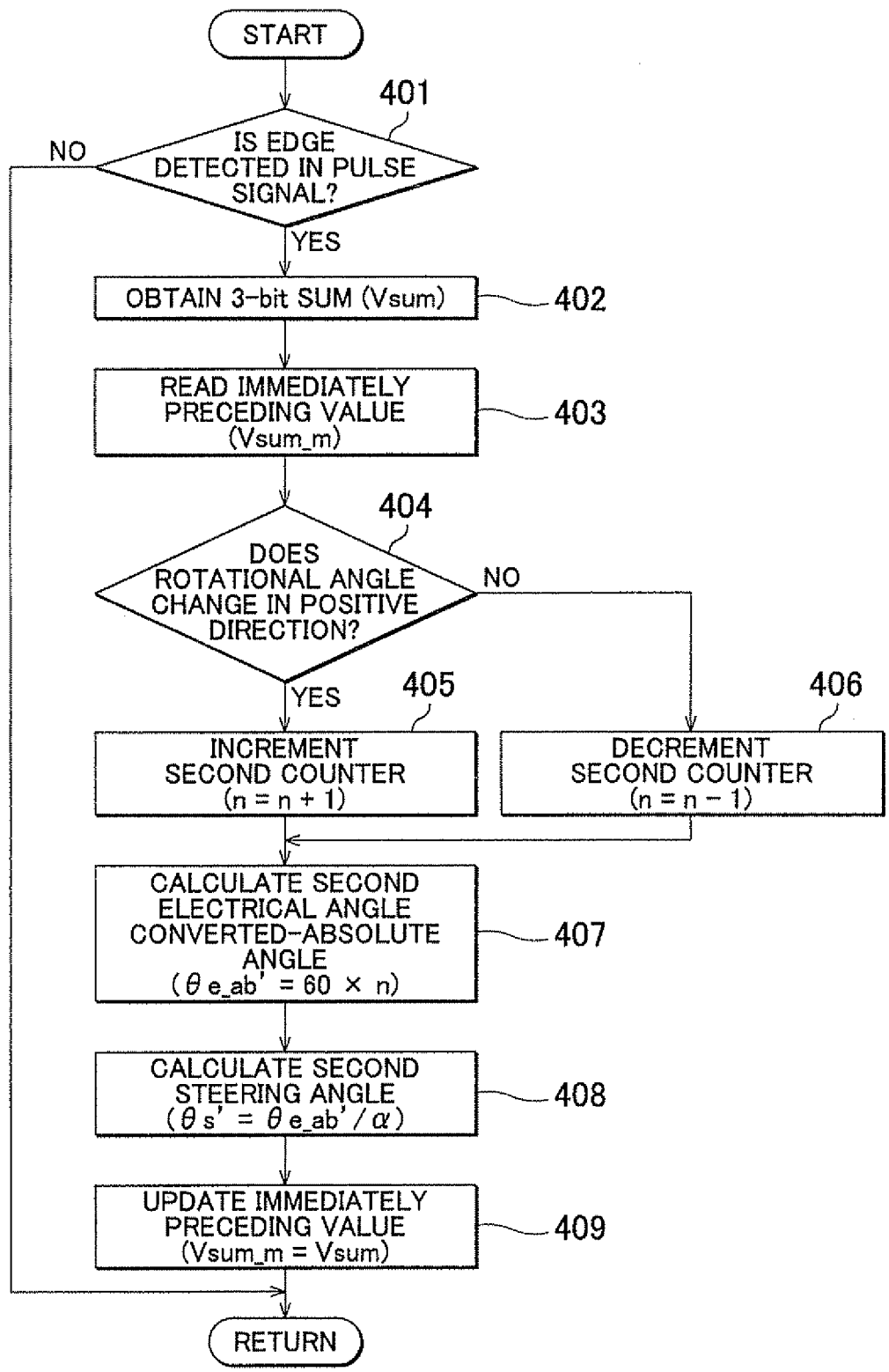
FIG. 10 is a flowchart showing the steps of detection of a second steering angle based on the three-phase pulse signals after the ignition is turned on according to a second embodiment of the invention.

More specifically, as shown in the flowchart in FIG. 10, when the microcomputer 21 detects an edge in one of the pulse signals P1, P2 and P3 that are received from the three-phase pulse generator 30 ("YES" in step 401), the microcomputer 21 obtains the 3-bit sum Vsum (step 402). Next, the microcomputer 21 reads the immediately preceding value Vsum_m of the pulse signals P1, P2 and P3 from the memory (not shown) (step 403), and determines whether the direction of a change in the rotational angle, which generates the edge, is the positive direction (step 404). If it is determined that the rotational angle changes in the positive direction ("YES" in step 404), the microcomputer 21 increments the second counter that detects a change in the rotational angle with an accuracy of 60° in electrical angle (n=n+1: step 405). If it is determined that the rotational angle changes in the negative direction ("NO" in step 404), the microcomputer 21 decrements the second counter (n=n−1: step 406).

The microcomputer 21 calculates the second electrical angle converted-absolute angle θe_ab' using the second count value n (θe_ab'=60×n: step 407). Then, the microcomputer 21 calculates the second steering angle θs' that is the steering angle that is detected based on the pulse signals P1, P2 and P3 by converting the second electrical angle converted-absolute angle θe_ab' into a mechanical angle (θs'=(θe_ab'/α: step 408).

After calculating the second steering angle θs' in the above-described manner, the microcomputer 21 updates the immediately preceding value Vsum_m to the 3-bit sum Vsum that is obtained through the current calculation (Vsum_m=Vsum: step 409). Then, if it is determined in step 401 that no edge is generated in the pulse signals P1, P2 and P3 ("NO" in step 401), step 402 and the following steps are not executed.

The microcomputer 21 has a function of determining whether the sine signal S_sin and the cosine signal S_cos received from the steering sensor 16 are abnormal and whether the three-phase pulse signals P1, P2 and P3 received from the three-phase pulse generator 30 are abnormal.

More specifically, if only one of the received sine signal S_sin and cosine signal S_cos changes, the microcomputer 21 that serves as a first abnormality determination unit determines that the sine signal S_sin and the cosine signal S_cos are abnormal.

Figure 11:
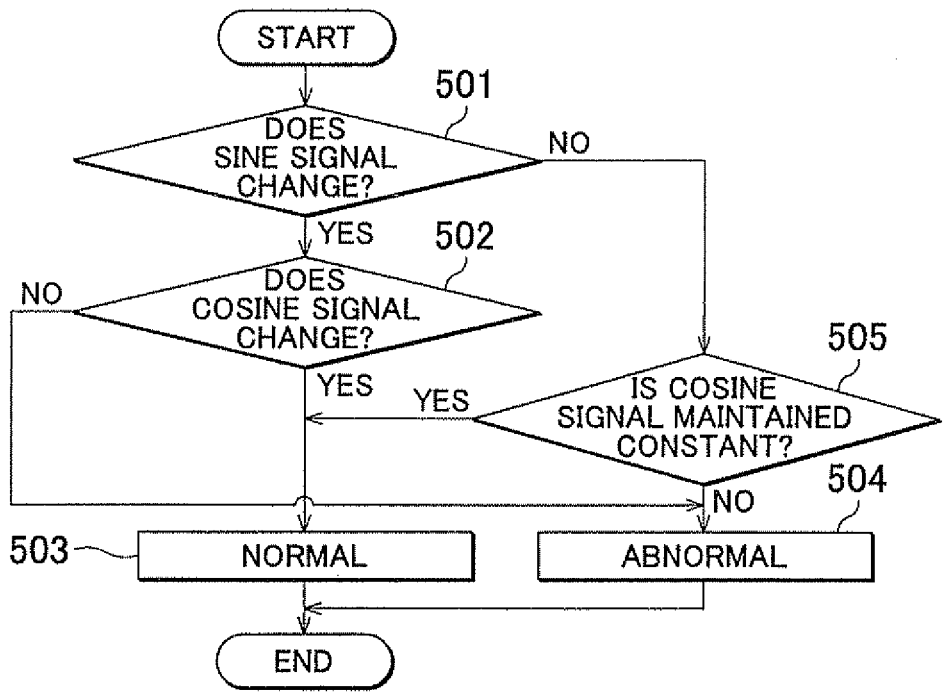
FIG. 11 is a flowchart showing the steps of determination as to whether the sine signal and the cosine signal are abnormal.

As shown in the flowchart in FIG. 11, the microcomputer 21 determines whether the value V1 of the sine signal S_sin changes (step 501), If it is determined that the sine signal S_sin changes ("YES" in step 501), the microcomputer 21 determines whether the value V2 of the cosine signal S_cos also changes (step 502). If it is determined that the cosine signal S_cos changes ("YES" in step 502), the microcomputer 21 determines that these signals are normal (step 503). On the other hand, if it is determined that there is no change in the cosine signal S_cos ("NO" in step 502), the microcomputer 21 determines that these signals are abnormal (step 504).

If it is determined in step 501 that the value V1 the sine signal S_sin is maintained constant ("NO" in step 501), the microcomputer 21 determines whether the value V2 of the cosine signal S_cos is also maintained constant (step 505). If it is determined that the value V2 of the cosine signal S_cos is maintained constant ("YES" in step 505), the microcomputer 21 determines that these signals are normal (step 503). On the other hand, if it is determined that the cosine signal S_cos is not maintained constant ("NO" in step 505), the microcomputer 21 determines that these signals are abnormal (step 504).

Figure 12:
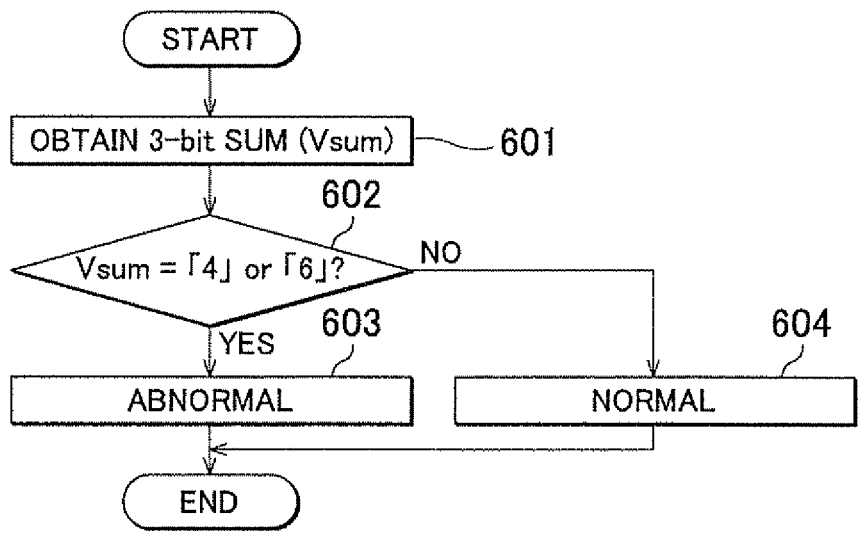
FIG. 12 is a flowchart showing the steps of determination as to whether the three-phase pulse signals are abnormal.

The microcomputer 21 that serves as the second abnormality determination unit determines whether the three-phase pulse signals P1, P2 and P3 are abnormal based on the 3-bit sum Vsum that indicates the output levels of the three-phase pulse signals P1, P2 and P3. More specifically, as shown in the flowchart in FIG. 12, when the microcomputer 12 receives the 3-bit sum Vsum (step 601), the microcomputer 21 determines whether the 3-bit sum Vsum is 2 or 6 (step 602). If it is determined that the 3-bit sum Vsum is 4 or 6 ("YES" in step 602), the microcomputer 21 determines that the pulse signals P1, P2 and P3 are abnormal (step 603). If it is determined that the 3-bit sum Vsum is a value other than 4 and 6 ("NO" in step 602), the microcomputer 21 determines that the pulse signals P1, P2 and P3 are normal (step 604).

That is, as shown in FIG. 6, the 3-bit sum Vsum takes one of the six values 7, 3, 2, 0, 1 and 5 that are the specific values corresponding to the regions (first region to sixth region) that are defined by the predetermined rotational angles that correspond to the respective edges of the three-phase pulse signals P1, P2 and P3. That is, if the pulse signals P1, P2 and P3 are normal, the 3-bit sum Vsum never takes the two remaining values among 0 to 7, which are expressed by 3-bit binary numbers, namely, the 3-bit sum Vsum takes neither 4 nor 6. Accordingly, when the 3-bit sum Vsum is 4 or 6, it is determined that the pulse signals P1, P2 and P3 are abnormal.

The ECU 11 (microcomputer 21) basically executes various compensation controls for the power assist control, using the steering angle θs as the first steering angle that is detected based on the sine signal S_sin and the cosine signal S_cos. When it is determined that the sine signal S_sin and the cosine signal S_cos received by the microcomputer 21 are abnormal in the above-described manner, if the three-phase pulse signals P1, P2 and P3 are normal, the power assist control is continued by using the second steering angle θs' as the steering angle that is detected based on the pulse signals P1, P2 and P3.

The microcomputer 21 receives the output levels of the sine signal S_sin and the cosine signal S_cos that have undergone A/D conversion. Accordingly, if there is not an abnormality in the sine signal S_sin and the cosine signal S_cos when these signals are output from the steering sensor 16, an abnormality may occur during the A/D conversion (due to, for example, a malfunction of an A/D converter).

However, A/D conversion is not required before the microcomputer 21 receives the pulse signals P1, P2 and P3. Therefore, even if the microcomputer 21 cannot receive the normal sine signal S_sin and cosine signal S_cos, the microcomputer 21 may receive the normal pulse signals P1, P2 and P3. In this case, the steering angles used in the power assist control (θs, θs') are switched and the various compensation controls for the power assist control are continued, as described above. In this way, the steering characteristics and the steering feel are maintained.

Next, descriptions will be provided concerning the steps for determining whether the sine signal S_sin and the cosine signal S_cos and the three-phase pulse signals P1, P2 and P3 are abnormal, and steps for switching the steering angles used in the power assist control (θs, θs') based on the determination results.

Figure 13:
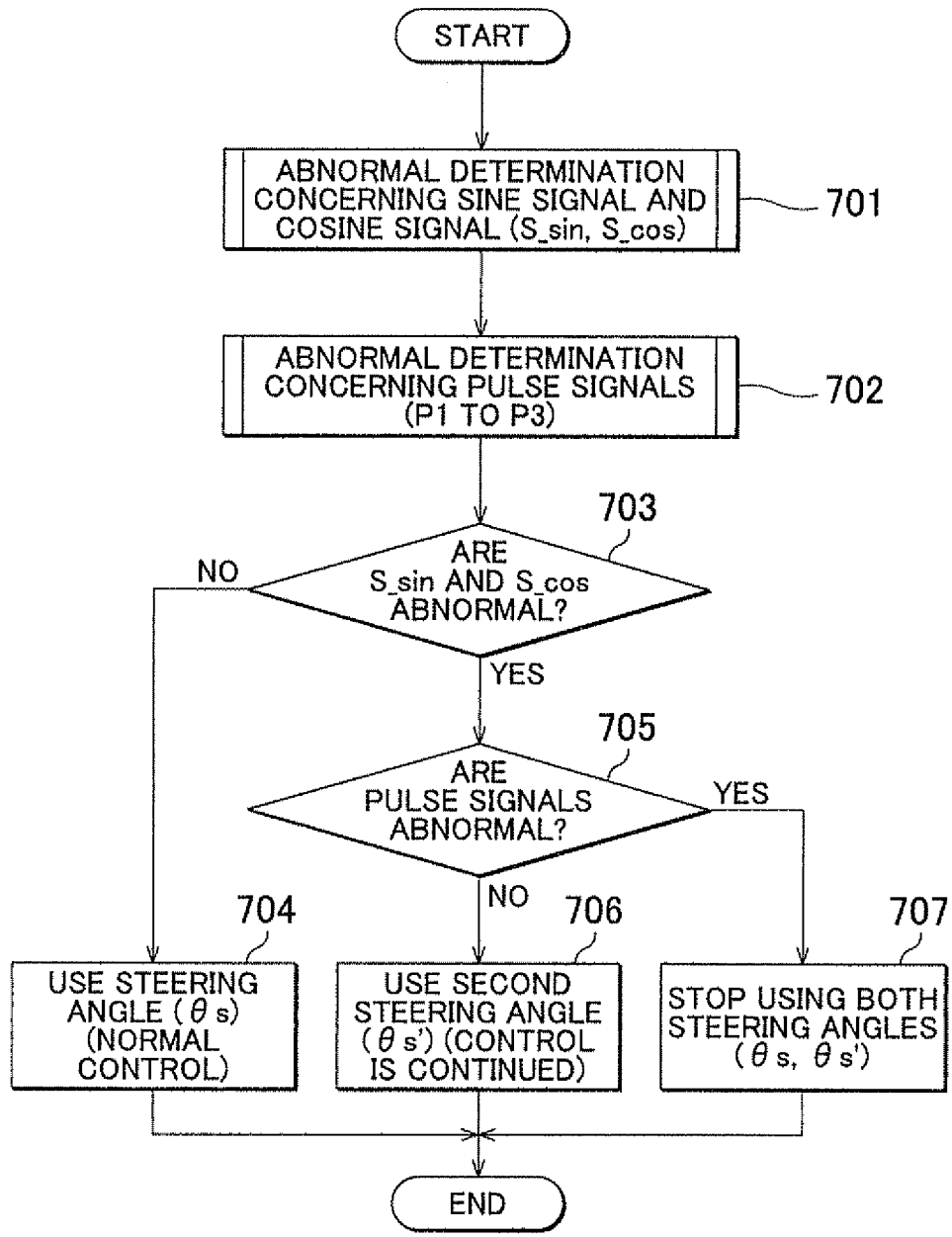
FIG. 13 is a flowchart showing the steps of switching the controls based on the results of determinations as to whether the sine signal and the cosine signal are abnormal and as to whether the three-phase pulse signals are abnormal.

As shown in the flowchart in FIG. 13, first, the microcomputer 21 makes an abnormality determination concerning the sine signal S_sin and the cosine signal S_cos (step 701). Then, the microcomputer 21 makes an abnormality determination concerning the three-phase pulse signals P1, P2 and P3 (step 702). Next, the microcomputer 21 determines whether the sine signal S_sin and the cosine signal S_cos are abnormal (step 703). If it is determined that the sine signal S_sin and the cosine signal S_cos are not abnormal ("NO" in step 703), the microcomputer 21 executes the power assist control using the steering angle θs that is the first steering angle that is detected based on the sine signal S_sin and the cosine signal S_cos (normal control: step 704).

If it is determined in step 703 that the sine signal S_sin and the cosine signal S_cos are abnormal ("YES" in step 703), the microcomputer 21 determines whether the three-phase pulse signals P1, P2 and P3 are abnormal (step 705). If it is determined that the pulse signals P1, P2 and P3 are not abnormal ("NO" in step 705), the microcomputer 21 continues the power assist control using the second steering angle θs' that is the second steering angle that is detected based on the pulse signals P1, P2 and P3 (normal control: step 706).

If it is determined in step 705 that the pulse signals P1, P2 and P3 are abnormal ("YES" in step 705), the microcomputer 21 stops using the steering angles (both θs and θs') in the power assist control (step 707).

According to the second embodiment, the following effects are produced.

1) The microcomputer 21 has a function of determining whether the sine signal S_sin and the cosine signal S_cos received from the steering sensor 16 are abnormal and whether the three-phase pulse signals P1, P2 and P3 received from the three-phase pulse generator 30 are abnormal.

With the configuration described above, it is possible to more accurately detect a problem caused in the detection of steering angle. In addition, it is possible to estimate the factor of the problem. For example, when the sine signal S_sin and the cosine signal S_cos are abnormal, if the pulse signals P1, P2 and P3 are normal, it is estimated that there is a problem in the A/D conversion (A/D converter) that is executed before the microcomputer 21 that is a digital processing unit receives the output levels of the sine signal S_sin and the cosine signal S_cos. When only the pulse signals P1, P2 and P3 are abnormal, it is estimated that the three-phase pulse generator 30 malfunctions. When both the sine signals S_sin and the cosine signal S_cos, and the pulse signals P1, P2 and P3 are abnormal, it is estimated that the steering sensor 16 malfunctions.

2) When the 3-bit sum Vsum is 4 or 6, the microcomputer 21 determines that the pulse signals P1, P2 and P3 are abnormal. When the pulse signals P1, P2 and P3 are normal, the 3-bit sum Vsum takes one of the six values corresponding to the regions (first region to sixth region) that are defined by the predetermined rotational angles that correspond to the respective edges of the three-phase pulse signals P1, P2 and P3. That is, if the pulse signals P1, P2 and P3 are normal, the 3-bit sum Vsum never takes the two remaining values among 0 to 7, namely, the 3-bit sum Vsum takes neither 4 nor 6. Accordingly, with the simple configuration described above, it is possible to determine whether the pulse signals P1, P2 and P3 are abnormal.

3) The ECU 11 (microcomputer 21) basically executes the power assist control using the steering angle θs that is the first steering angle that is detected based on the sine signal S_sin and the cosine signal S_cos. When it is determined that the sine signal S_sin and the cosine signal S_cos are abnormal, if the three-phase pulse signals P1, P2 and P3 are normal, the power assist control is continued using the second steering angle θs' that is the second steering angle that is detected based on the pulse signals P1, P2 and P3.

That is, if the factor of a problem caused in the detection of steering angle is in A/D conversion that is executed before the microcomputer 21 that is the digital processing unit receives the output levels of the sine signal S_sin and the cosine signal S_cos, there is no problem in detection of the second steering angle θs' based on the pulse signals P1, P2 and P3. Accordingly, with the configuration described above, it is possible to continuously maintain the steering characteristics and the steering feel.

The embodiments described above may be modified as follows.

In the embodiments described above, the invention is applied to the so-called column-type EPS 1. Alternatively, the invention may be applied to a pinion assist-type EPS or a rack assist-type EPS.

Figure 14:
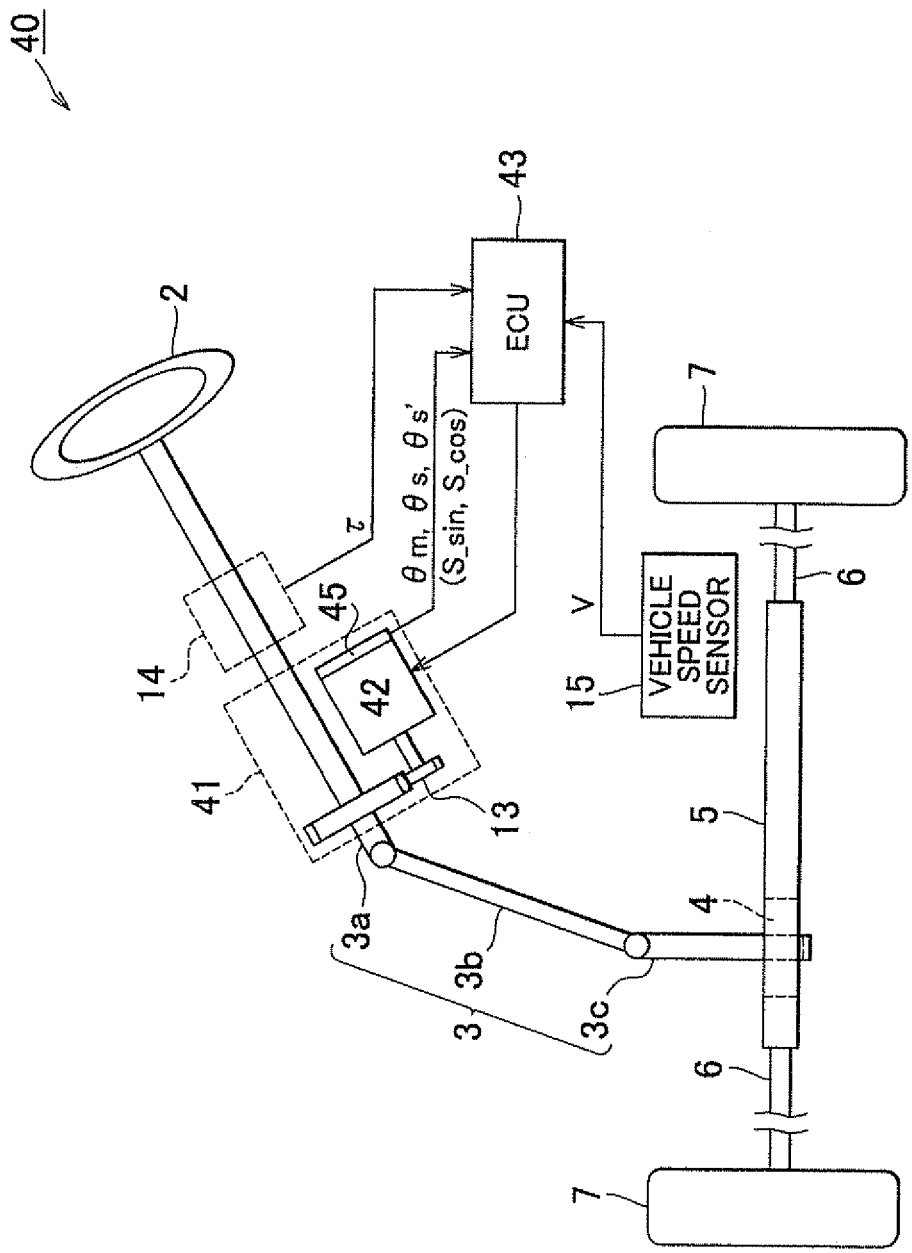
FIG. 14 is a view schematically showing the structure of an EPS in another example.
Figure 15:
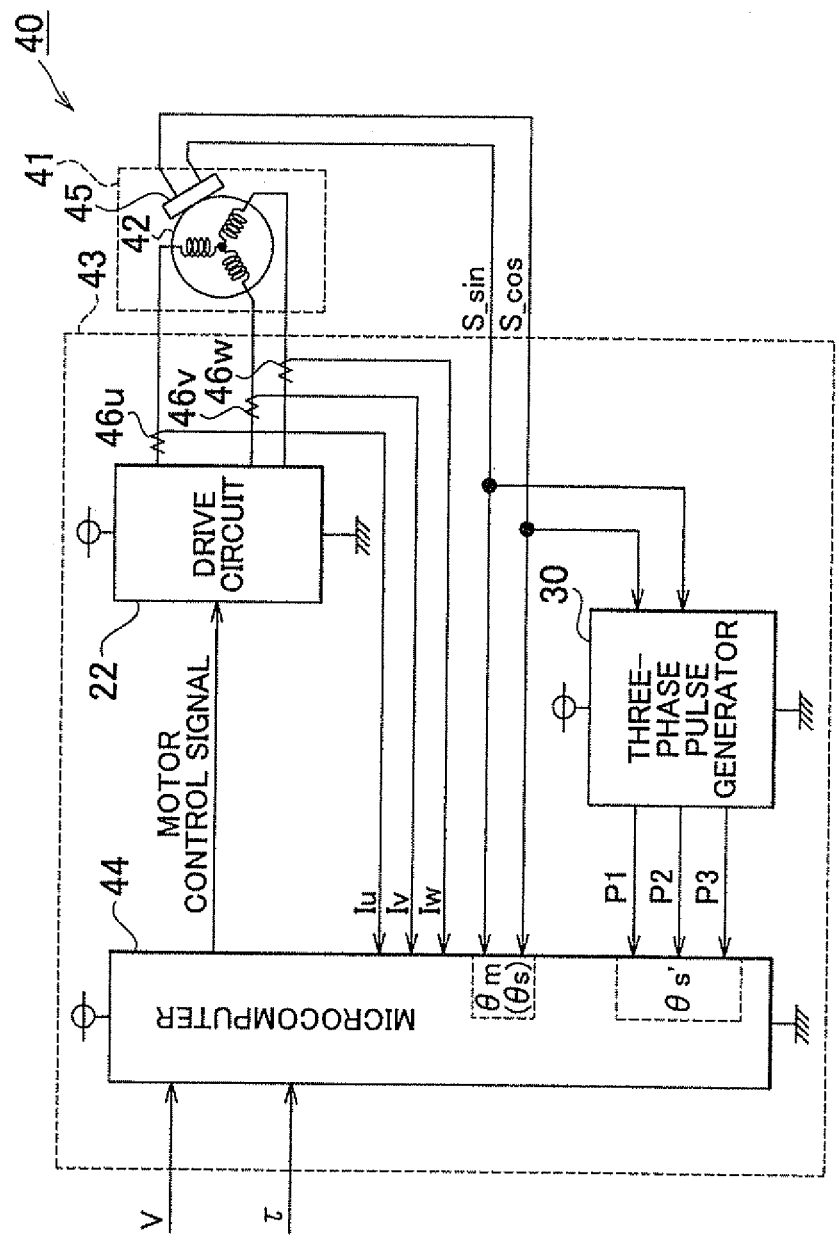
FIG. 15 is a block diagram schematically showing the electrical configuration of the EPS in the other example.

In the embodiments described above, the steering angle θs formed by the steering wheel 2 is detected based on the sine signal S_sin and the cosine signal S_cos that are output from the rotational angle sensor provided on the column shaft 3a as the steering sensor 16. However, the invention is not limited to this. As in an EPS 40 shown in FIGS. 14 and 15, the invention may be implemented in an embodiment in which the steering angle θs is detected by converting the rotational angle θm of a motor 42 that is a drive source of an EPS actuator 41.

In the EPS 40, a brushless motor is used as the motor 42, and an ECU 43 (microcomputer 44) that serves as a first rotational angle detector detects the rotational angle θm of the motor 42 based on the sine signal S_sin and the cosine signal S_cos output from a rotational angle sensor (motor resolver) 45 provided in the motor 42. The microcomputer 44 detects the phase current values Iu, Iv and Iw that are values of current actually supplied to the motor 42, using current sensors 46u, 46v and 46w, respectively. The microcomputer 44 detects the steering angle θs formed by the steering wheel 2 by converting the rotational angle θm of the motor 42 into a rotational angle of the steering shaft 3 (column shaft 3a) to which the steering wheel 2 is secured, based on the speed reduction ratio used in the speed reduction mechanism 13 that constitutes the EPS actuator 41.

In this configuration, the sine signal S_sin and the cosine signal S_cos output from the rotational angle sensor 45 that constitutes the motor resolver may be input in the three-phase pulse generator 30. Thus, it is possible to generate the three-phase pulse signals P1, P2 and P3 similar to those in the embodiments described above, and detect the steering angle based on the pulse signals P1, P2 and P3. In this case, the conversion process executed with the speed reduction ratio of the speed reduction mechanism 13 taken into account is required even when the second steering angle θs' that is the second steering angle is calculated.

In the embodiments described above, the microcomputer 21 recognizes the pulse signals P1, P2 and P3 that are output from the three-phase pulse generator 30 as 3-bit signals. When the output level of each of the pulse signals P1, P2 and P3 is high, the pulse signal indicates 1. When the output level of each of the pulse signals P1, P2 and P3 is low, the pulse signal indicates 0. The 3-bit sum Vsum takes one of the six values 7, 3, 2, 0, 1, 5 that are the specific values corresponding to the regions (first region to sixth region) that are defined by the predetermined rotational angles that correspond to the respective edges of the three-phase pulse signals P1, P2 and P3. However, the invention is not limited to this. The microcomputer 21 and the three-phase pulse generator 30 may be formed such that when the output level of each of the pulse signals P1, P2 and P3 is high, the pulse signal indicates 0, whereas when the output level of each of the pulse signals P1, P2 and P3 is low, the pulse signal indicates 1. In this case, the values that are used as abnormal values in determination as to whether the pulse signals P1, P2 and P3 are abnormal are 3 and 1, instead of 4 and 6 in the second embodiment.

In the embodiments described above, the three-phase pulse generator 30 includes the voltage-dividing circuit 31 that is formed by connecting the four resistances R1 to R4, of which the resistance values are equal to each other, in series, and the three comparators 32, 33 and 34 that receive the voltage-dividing signals (Vh, Vm, Vl) that have output levels equal to the divided voltages between the resistances R1 and R2, the resistances R2 and R3, and the resistances R3 and R4, respectively. However, the configuration is not limited to this.

A pulse generator that is able to output two-phase, four-phase or more than four-phase pulse signals by changing the resistances that constitute the voltage-dividing circuit and the comparators.

In the second embodiment, when only one of the sine signal S_sin and the cosine signal S_cos changes, it is determined that the sine signal S_sin and the cosine signal S_cos are abnormal. However, the method of determining whether the sine signal S_sin and the cosine signal S_cos are abnormal is not limited to this.

In the second embodiment, when the 3-bit sum Vsum is 4 or 6, it is determined that the pulse signals P1, P2 and P3 are abnormal. However, the method of determining whether the pulse signals P1, P2 and P3 are abnormal is not limited to this.

What is claimed is:

1. A rotational angle detection device that detects a rotational angle of a detection target, the rotational angle detection device comprising:
    a rotational angle sensor that outputs a sine signal and a cosine signal of which output levels are changed in accordance with the rotational angle;
    a first rotational angle detector that detects the rotational angle based on the sine signal and the cosine signal, the first rotational angle detector detecting the rotational angle when the rotational angle detection device is in an ignition-on mode;
    a pulse signal generator that generates, based on the sine signal and the cosine signal, three-phase pulse signals that have edges corresponding to predetermined rotational angles of the detection target and that are set in such a manner that the predetermined rotational angles do not overlap each other and are at regular intervals; and
    a second rotational angle detector that detects the rotational angle based on the pulse signals when the pulse signals indicate an edge, the second rotational angle detector detects the rotational angle when the rotational angle detection device is in the ignition-on mode or when the rotational angle detection device is in an ignition-off mode, wherein
    when the rotational angle detection device is in an ignition-off mode and the second rotational angle detector detects the edge, the second rotational angle detector compares the detected rotational angle to a stored and previously measured rotational angle to determine whether the rotation angle detection device is rotating in a positive direction or a negative direction.

2. The rotational angle detection device according to claim 1, wherein the pulse signal generator includes:
    a voltage-dividing circuit which is formed by connecting four resistances, of which resistance values are equal to each other, in series, and to which a voltage that corresponds to a maximum value of the sine signal and the cosine signal is applied;
    a first comparator that receives a high potential signal that is one of voltage-dividing signals output from the voltage-dividing circuit and the cosine signal;
    a second comparator that receives a medium potential signal that is one of the voltage-dividing signals output from the voltage-dividing circuit and the sine signal; and
    a third comparator that receives a low potential signal that is one of the voltage-dividing signals output from the voltage-dividing circuit and the cosine signal.

3. The rotational angle detection device according to claim 2, wherein the first rotational angle detector corrects an initial value of the rotational angle that is calculated when the first rotational angle detector restarts, using a second rotational angle that is continuously detected by the second rotational angle detector based on the pulse signals while the first rotational angle detector is stopped.

4. The rotational angle detection device according to claim 3, further comprising:
    a starting unit that starts the second rotational angle detector when the edge is detected.

5. The rotational angle detection device according to claim 1, further comprising:
    a first abnormality determination unit that determines whether the sine signal and the cosine signal that are received by the first rotational angle detector are abnormal; and
    a second abnormality determination unit that determines whether the pulse signals that are received by the second rotational angle detector are abnormal.

6. An electric power steering system that detects a steering angle formed by a steering wheel using the rotational angle detection device according to claim 1.

7. An electric power steering system that detects a steering angle formed by a steering wheel using the rotational angle detection device according to claim 5, wherein:
    a power assist control is executed using a first steering angle that is detected based on the sine signal and the cosine signal; and
    when the sine signal and the cosine signal that are received by the first rotational angle detector are abnormal, if the pulse signals that are received by the second rotational angle detector are normal, the power assist control is continued using a second steering angle that is detected based on the pulse signals.

8. The rotational angle detection device according to claim 2, further comprising:

a first abnormality determination unit that determines whether the sine signal and the cosine signal that are received by the first rotational angle detector are abnormal; and a second abnormality determination unit that determines whether the pulse signals that are received by the second rotational angle detector are abnormal.

9. The rotational angle detection device according to claim 3, further comprising:

a first abnormality determination unit that determines whether the sine signal and the cosine signal that are received by the first rotational angle detector are abnormal; and a second abnormality determination unit that determines whether the pulse signals that are received by the second rotational angle detector are abnormal.

10. The rotational angle detection device according to claim 4, further comprising:

a first abnormality determination unit that determines whether the sine signal and the cosine signal that are received by the first rotational angle detector are abnormal; and a second abnormality determination unit that determines whether the pulse signals that are received by the second rotational angle detector are abnormal.

11. An electric power steering system that detects a steering angle formed by a steering wheel using the rotational angle detection device according to claim 2.

12. An electric power steering system that detects a steering angle formed by a steering wheel using the rotational angle detection device according to claim 3.

13. An electric power steering system that detects a steering angle formed by a steering wheel using the rotational angle detection device according to claim 4.

14. An electric power steering system that detects a steering angle formed by a steering wheel using the rotational angle detection device according to claim 8, wherein:

a power assist control is executed using a first steering angle that is detected based on the sine signal and the cosine signal; and when the sine signal and the cosine signal that are received by the first rotational angle detector are abnormal, if the pulse signals that are received by the second rotational angle detector are normal, the power assist control is continued using a second steering angle that is detected based on the pulse signals.

15. An electric power steering system that detects a steering angle formed by a steering wheel using the rotational angle detection device according to claim 9, wherein:

a power assist control is executed using a first steering angle that is detected based on the sine signal and the cosine signal; and when the sine signal and the cosine signal that are received by the first rotational angle detector are abnormal, if the pulse signals that are received by the second rotational angle detector are normal, the power assist control is continued using a second steering angle that is detected based on the pulse signals.

16. An electric power steering system that detects a steering angle formed by a steering wheel using the rotational angle detection device according to claim 10, wherein:

a power assist control is executed using a first steering angle that is detected based on the sine signal and the cosine signal; and when the sine signal and the cosine signal that are received by the first rotational angle detector are abnormal, if the pulse signals that are received by the second rotational angle detector are normal, the power assist control is continued using a second steering angle that is detected based on the pulse signals.

* * * * *